United States Patent Office 2,898,966
Patented Aug. 11, 1959

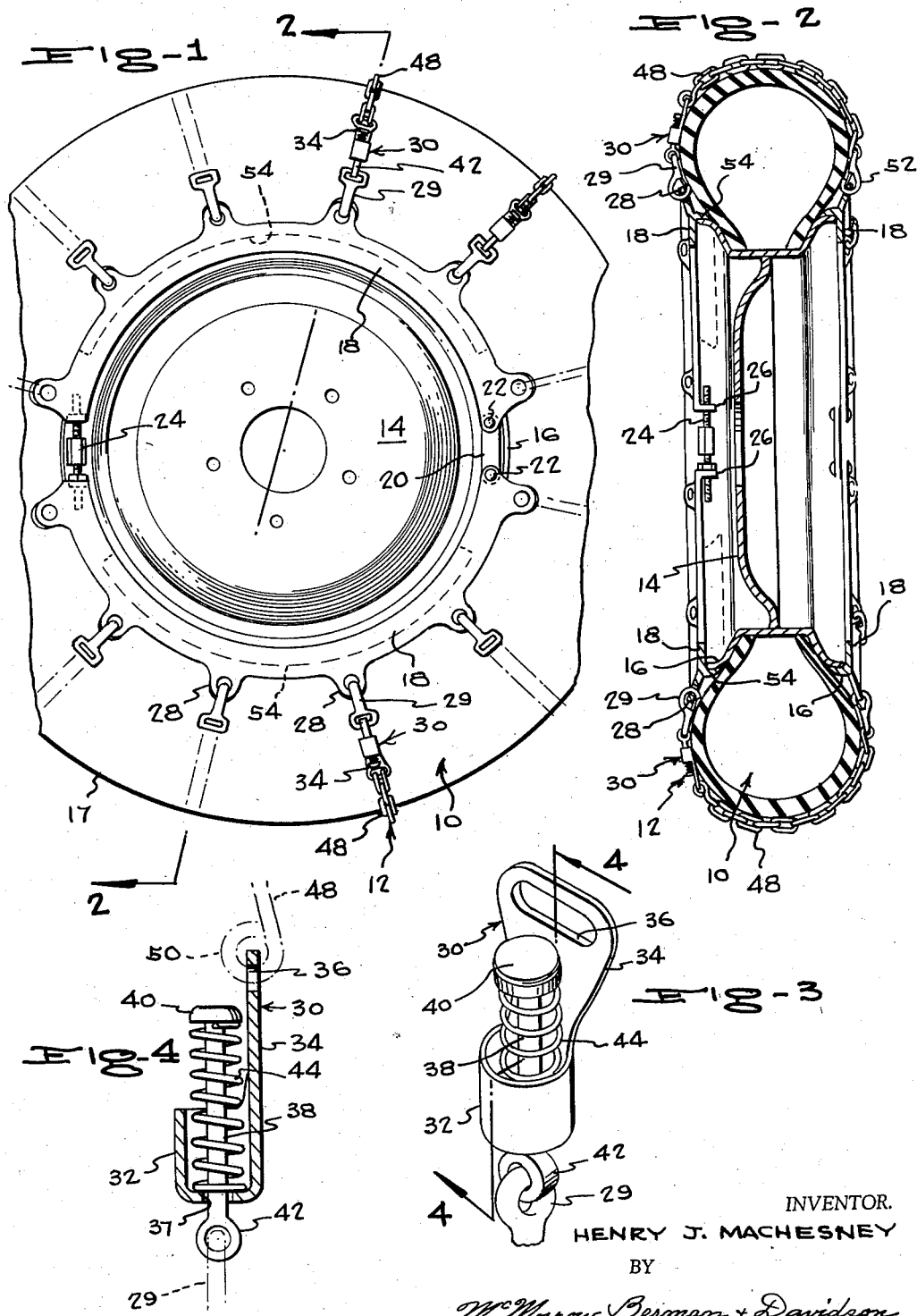

2,898,966

SNAP-ON TIRE CHAIN ASSEMBLY FOR VEHICLES

Henry J. Machesney, Pittsburgh, Pa.

Application July 12, 1957, Serial No. 671,535

2 Claims. (Cl. 152—233)

This invention relates to antiskid or traction chains, of the type applied to the pneumatic tires of automobiles and other vehicles. More particularly, the invention has reference to an improved tire chain assembly, characterized by the ease with which the same is to be attached to or detached from the associated wheel.

Heretofore, tire chains have been rather difficult to apply, and in view of the circumstances under which said chains must be applied, that is, in heavy snows, etc., many vehicle operators avoid the use of tire chains, except where it becomes absolutely essential that chains be applied. This, of course, contributes to accidents, due to the absence of chains on vehicles when the road is slippery, icy, or snow-covered.

The difficulty and inconvenience attendant upon the application of conventional tire chains has been, it is believed, the primary reason for the failure on the part of many vehicle operators to use said chains regularly. In this connection, one important object of the present invention is to provide a tire chain assembly that will be characterized by the relatively low cost of the same, considering the decided advantages inherent in the assembly, said assembly resulting from the particular ease and speed with which the chains may be applied or removed.

Another object is to provide a tire chain assembly of the character stated that will include support rings attachable to the inner and outer sides of a vehicle wheel of conventional design, without requiring modification of said vehicle wheels.

Another object is to so form the support rings that they can be swiftly attached to or detached from the vehicle wheel, and will, when attached, become in effect a rigid or integral part of the wheel, adapted to be left on the wheel for the entire winter season even though the cross chains are removed and applied a number of times during said season.

Another object is to provide, in a tire chain assembly of the character stated, means that will insure the secure locking of the side rings of the device, without in any way adversely affecting the relationship and operational characteristics of the wheel rim and of the pneumatic tire.

Another object is to provide cross chain means connectable between the support rings at angularly spaced locations upon the support rings, which means will be particularly designed to facilitate the connection and disconnection of the same.

Another object is to provide, as components of the cross chain means, resiliently yielding connector devices, especially well adapted, by reason of their novel construction, to hold the cross chain snuggly against the vehicle tire during operation of the vehicle, and to absorb the shock transmitted to the chain during traction.

Another object is to so design the resiliently yielding units referred to above as to facilitate their connection to or disconnection from the associated, adjacent components of the device.

Another object is to facilitate the attachment of the cross chains, particularly at the inner side of the tire where the accessibility is relatively limited.

Other objects will appear from the following description, the claims appended thereto, and from the annexed drawing, in which like reference characters designate like parts throughout the several views, and wherein:

Figure 1 is a front elevational view of a vehicle tire, portions being broken away, the tire chain assembly being applied to the tire and being illustrated with a plurality of the cross chain components shown only in dotted outline;

Figure 2 is a sectional view diametrically through the tire, substantially on line 2—2 of Figure 1;

Figure 3 is an enlarged perspective view of one of the tension spring units per se; and Figure 4 is a longitudinal sectional view substantially on line 4—4 of Figure 3, through said spring unit.

Referring to the drawings in detail, the vehicle wheel has been generally designated 10, and applied thereto is the tire chain assembly constituting the present invention.

The vehicle wheel includes the usual rim 14, having the rim flange 16, with the tire casing being designated at 17. All this is conventional construction and does not per se constitute part of the present invention.

In accordance with the invention, the tire chain assembly 12 includes identical but opposite inner and outer mounting rings, attachable to the wheel rim at the outer and inner sides of the wheel. Each ring includes cooperating, confronting, substantially semi-circular ring sections 18, one end of which are connected to the opposite ends of a hinge or connecting link 20, by means of pivotal connections 22. Thus, each of the ring sections 18 may swing upon its pivot pin 22, independently of the other ring section.

Diametrically opposite the hinge link 20 is a longitudinally expansible connector means, connected between the other ends of the arcuate sections 18. This is shown, in the illustrated example, as a turnbuckle 24, the opposite ends of which are of course formed with threads of opposite hand, said ends being projected through openings formed in inwardly directed lips 26 of the respective sections 18 (see Figure 2).

It will be understood that the turnbuckle can be detached completely from one of the sections 18, so that the sections can be spread at the ends thereof remote from the hinge link 20. The sections can thus be positioned in concentric relation to the wheel rim. The mounting ring at the inner sides of the tire can, by spreading of the sections 18, be fitted over the wheel axle housing, as will be readily understood.

In any event, the respective ring sections are adapted to be secured fixedly to the outer and inner sides of the wheel rim, and left upon the same throughout the winter season, so that it will thereafter become necessary merely to apply cross chains whenever the tire chain assembly is needed due to bad road conditions. To this end, each section is provided with a plurality of uniformly, angularly spaced, radially outwardly extending lugs 28 having openings, and removably engaged with the respective lugs or snap-type clasps 29 (Figures 1 and 2).

Resiliently yieldable connecting means is provided upon each cross chain, in the form of a tension spring unit generally designated 30. Each of these units includes a cup 32, having a back wall 34 projected longitudinally beyond the open end of the cup, said back wall 34 being progressively increased in width in a direction away from the cup as clearly shown in Figure 3 and being formed at its wider end with a transversely elongated aperture 36.

The bottom wall of the cup has a center opening 37, and freely, axially slidable in the center opening is a plunger 38 one end of which is provided with a head 40, the other end of which plunger has an eye 42 disposed outwardly from the closed end of the cup. The clasp 29 is permanently, pivotally connected to the eye 42.

A compression, coil spring 44 is circumposed about the plunger 38, and abuts at one end against the head 40. The other end of the spring abuts against the bottom wall of the cup 32. The spring, tending to expand, biases the plunger 38 in a direction radially outwardly from the adjacent mounting ring 18. Stated otherwise, the spring biases the cup 32 and its associated wall 34 radially inwardly of the mounting ring. As a result, a cross chain 48, having at one end a link 50 connected to the wall 34 through opening 36, is tensioned across the tread of the tire. At its other end, the cross chain 48 has a snap-type connector or clasp 52 connectable to the corresponding apertured lug 28 of the inside mounting ring as clearly shown in Fig. 2.

In application of the device to a tire, as previously noted the mounting rings would be left upon the wheel throughout the winter season. Then, one need merely connect the individual cross chains across the tread of the tire, between corresponding portions of the mounting rings. In other words, one would connect each snap 29 to a lug 28, after having first connected the chain 48 by means of clasp 52 to the inner mounting ring. It will be seen that the cross chains are attachable swiftly and easily, and are firmly tensioned across the tire tread, so that they will not be loose during operation of the vehicle. Although firmly tensioned across the tread of the tire, the cross chains nevertheless are free to yield as necessary, by reason of the connector units 30, which are extendable resiliently in length in a direction radially of the mounting rings.

In this way, the cross chains are held snugly against the tire during the operation of the vehicle, and the shocks imparted to the chain during traction are effectively absorbed. At the same time, the snap hooks or clasps 29, 52 are very easy to apply, particularly on the inner side of the tire. Still further, the mounting rings are each so formed as to particularly facilitate the application of the same to the inner and outer sides of the wheel. By use of the same type of ring on both sides of the wheel, manufacturing costs are reduced considerably.

As shown in Figure 2, each mounting ring is provided with a continuous, inwardly directed flange 54, engageable over the rim flange 16, so as to cause the respective ring sections to hook onto the rim flange, and be frictionally bound thereagainst responsive to shortening of the turnbuckle.

It will be noted that the anti-skid chain constituting the invention can be put on or taken off without the use of a jack. This is an important feature of the invention, since ordinarily the wheel must be raised out of contact with the road surface when an anti-skid chain is being put on or taken off.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A tire chain assembly for a wheel including a rim and a tire casing, comprising: inner and outer mounting rings; means for connecting said rings to the inner and outer side edges, respectively, of the wheel rim; cross chains extendable across the casing between the rings; fastener elements detachably connecting the cross chains to the respective rings; and resilient, yielding means connected between at least one end of each cross chain and the fastening element adjacent thereto, comprising a cylindrical, rigid container having a deep cupped part provided with a cylindrical side wall and formed open at one end, the other end of the cupped part having an end wall formed with a center opening, said container being formed with a back wall adapted for engagement against the adjacent side wall of the tire casing, said back wall being projected longitudinally a substantial distance beyond the open end of the cupped part and being progressively increased in width in a direction away from the cupped part, said back wall being flat over the full length of the portion thereof that projects beyond said open end of the cupped part, the plane of the flat, projecting portion being substantially tangential to the cupped part of the container so as to dispose said cupped part wholly at one side of the flat, projecting portion of the back wall, whereby the plane of the flat back wall portion will lie between the cupped part and the tire casing when the back wall is engaged against the side wall of the casing, the widest part of the back wall portion being greater in width than the diameter of the cupped part, said back wall being formed at its wider end with an aperture adapted to receive the adjacent end of the associated cross chain, a plunger freely, axially slidable in said center opening of the end wall of the cupped part, said plunger being formed with a head at one end thereof and being connected at its other end to one of the fastening elements, whereby to connect said plunger at said other end thereof to the adjacent ring, and a compression, coil spring circumposed about the plunger and abutting at one end against said head, said spring at its other end abutting against the bottom wall of the cupped part, said side wall of the cupped part being spaced from the convolutions of the spring and extending completely around the portions of the spring and of the plunger that extend within the cupped part.

2. A tire chain assembly for a wheel including a rim and a tire casing, comprising: identical but opposite inner and outer mounting rings each of which includes confronting ring sections, each ring section extending through approximately one-hundred eighty degrees and including a continuous, inwardly directed flange engageable over the adjacent edge of the rim so as to hook onto the rim, each ring section further including a main portion extending the full length of the section and projecting radially inwardly of the mounting ring from the flange to which said main portion is secured, each section further including a plurality of radially outwardly extending lugs uniformly, angularly spaced about the circumference of the mounting ring and projecting outwardly of the mounting ring beyond the flanges of the respective ring sections, a link pivotally connected between one end of the respective sections of each ring, and turnbuckles connected between the other ends of the sections of each ring, the link and turnbuckle of each ring being carried by the main portions of the sections of the ring; detachable fastening elements carried by the lugs, said elements when connected to the lugs being freely swingable about axes that are approximately tangential to the ring and are perpendicular to radii of the ring passing through the lugs, said fastening elements being connected to the lugs for limited swivelling movement about axes defined by said radii; cross chains extending between corresponding fastening elements of the respective mounting rings; and resilient, yielding connections between one end of the cross chains and the fastening elements adjacent the same, said resilient connections being disposed in close proximity to the outer mounting ring, with the fastening elements of the inner mounting ring being connected directly to the other ends of the cross chains, the resilient, yielding connections including plungers engaged at one end with the fastening elements of the outer mounting ring for limited swivelling movement about axes substantially coincident with the axes of swivelling movement of their associated fastening elements, containers including cupped parts in which the plungers are axially slidable, said containers further including back walls having wide portions projecting beyond one end of the cupped parts so as to engage against the tire casing and be held by the tire casing against rotation, said one end of the cross chains being connected directly to said back walls, and compression, coil springs circumposed about the plungers and abutting at their opposite ends against the containers and the other ends of the plungers respectively.

References Cited in the file of this patent

UNITED STATES PATENTS

| | | |
|---|---|---|
| 762,593 | Lexner | June 14, 1904 |
| 1,999,713 | Bambenek | Apr. 30, 1935 |
| 2,204,886 | Devlin | June 18, 1940 |
| 2,639,753 | Pike | May 26, 1953 |
| 2,670,164 | Gill | Feb. 23, 1954 |
| 2,778,400 | Charlton | Jan. 22, 1957 |